United States Patent
Farr et al.

[19]

[11] Patent Number: 6,091,451
[45] Date of Patent: Jul. 18, 2000

[54] DIGITAL IMAGING SYSTEM HAVING AN ANTI COLOR ALIASING FILTER

[75] Inventors: Mina Farr; Ricardo J. Motta, both of Palo Alto, Calif.

[73] Assignee: Hewlett-Packard Company, Palo Alto, Calif.

[21] Appl. No.: 08/914,353

[22] Filed: Aug. 19, 1997

[51] Int. Cl.[7] ..................................................... H04N 3/14
[52] U.S. Cl. ........................ 348/342; 348/273; 348/276; 348/289
[58] Field of Search ..................................... 348/273, 276, 348/277, 289, 285, 290, 292, 340, 335, 342, 360; 257/440; 359/569, 619, 741, 891, 576, 738, 892, 559, 564, 558, 885; 356/416, 418, 414, 419

[56] References Cited

U.S. PATENT DOCUMENTS

| | | | |
|---|---|---|---|
| 3,585,284 | 6/1971 | Macovski | 348/292 |
| 3,591,709 | 7/1971 | Takagi | 386/30 |
| 3,882,535 | 5/1975 | Takeumra | 348/292 |
| 3,940,788 | 2/1976 | Abe et al. | 348/291 |
| 4,009,939 | 3/1977 | Okano | 348/292 |
| 4,246,601 | 1/1981 | Sato et al. | 348/277 |
| 4,701,789 | 10/1987 | Boyne | 348/816 |
| 5,322,998 | 6/1994 | Jackson | 250/216 |
| 5,353,056 | 10/1994 | Westerink et al. | 348/263 |
| 5,438,366 | 8/1995 | Jackson et al. | 348/342 |
| 5,528,295 | 6/1996 | Wagner | 348/273 |
| 5,684,293 | 11/1997 | Kessler | 348/342 |

*Primary Examiner*—Wendy Garber
*Assistant Examiner*—Mitchell White
*Attorney, Agent, or Firm*—Thomas X. Li

[57] ABSTRACT

An anti-color aliasing filter for a digital imaging system is includes a first filtering region that allows any color to pass through. The filter also includes a second filtering region adjacent to the first filtering region to allow a particular color or colors to pass through in order to adjust the color frequency response of the digital imaging system to the remaining colors without affecting the frequency response of the digital imaging system to the colors passing through the second filtering region, such that color aliasing is minimized in the digital imaging system.

3 Claims, 14 Drawing Sheets

WAVL 430nm (blue)

WALV 600nm (red)

WAVL 525nm (green)

PATCH SIZE=10 MICRONS.

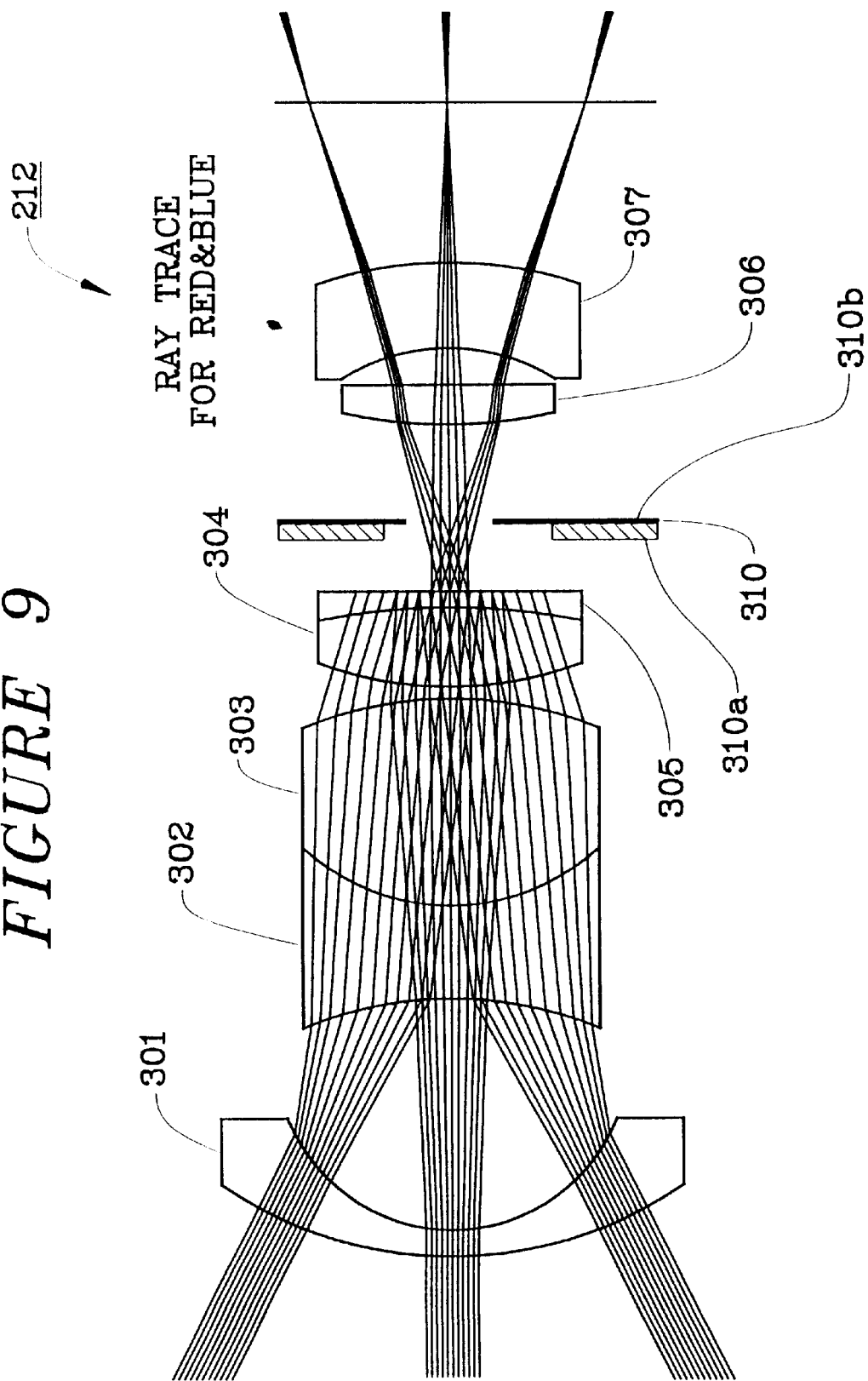

WAVL 430nm (blue)

WAVL 600nm (red)

WAVL 525nm through green ring filter

PATCH SIZE=10 MICRONS.

DIGITAL IMAGING SYSTEM HAVING AN ANTI COLOR ALIASING FILTER

BACKGROUND OF THE INVENTION

1. Field of the Invention

The present invention pertains to digital imaging systems. More particularly, this invention relates to a digital imaging system with an anti color aliasing filter.

2. Description of the Related Art

As is known, a digital imaging system typically includes an optical arrangement for imaging an object or objects of interest onto a sensor. The sensor has many discrete mono-color pixels that sample the image formed on the sensor by the optical arrangement. The sensor provides the digitized raw image. The digitized raw image is then manipulated by a digital image processing system of the digital imaging system to form the final image.

In order to achieve perfect image reconstruction in a digital imaging system, it is necessary for the sensor to sample the image captured by the imaging system at the Nyquist or higher rate. This means that each line pair or optical line of the image is sampled twice by the sensor pixels.

The overall resolving capability of a digital imaging system can be summarized in the form of its Modulation Transfer Function (MTF) which typically indicates the system's response to different spacial frequencies. The MTF is defined as the ratio R between the magnitude variation or modulation of the image intensity and that of the object. The ratio R can be expressed as follows:

$$R=(I_{max\ (image)}-I_{min\ (image)})/(I_{max\ (object)}-I_{min\ (object)}),$$

wherein $I_{max\ (image)}$ represents the maximum image intensity, $I_{min\ (image)}$ represents the minimum image intensity, $I_{max\ (object)}$ represents the maximum object intensity, and $I_{min\ (object)}$ represents the minimum object intensity.

In an ideal situation, the imaging optics provides a high modulation transfer of the frequencies at or below the sampling frequency (Nyquist) and, at the same time, a very small modulation transfer of the frequencies much higher than the sensor sampling rate.

FIG. 1 shows a representative behavior of three typical digital imaging systems in response to a range of spacial frequency input signals 11 through 13. As can be seen from FIG. 1, each digital imaging system has different MTF responses (i.e., 11a–11c, 12a–12c, and 13a–13c) at the three object frequencies 11–13. FIGS. 2A and 2B show the MTF plots of each of the three imaging systems with respect to a range of frequencies, along with a typical visibility line or a minimum detectable modulation level.

When the modulation of the image falls below the overall minimum detectable modulation level of the system which constitutes the minimum detectable modulation level of the sensor and the viewer's eye, the object pattern is considered not resolvable. Thus, the visibility line represents an upper limit for the resolving power of any practical imaging system. As can be seen from FIGS. 2A–2B, this upper resolution limit is the spacial frequency where the visibility line crosses the MTF curve for each specific system, giving a resolvable object area bounded by the visibility line and the MTF curve. Within this area, the MTF curve represents the visibility of the object at the specific frequencies.

When an imaged object contains some form of repeated patterns, the discrete form of sampling of the digital imaging system can inherently result in Moire pattern on the final image. The Moire pattern is caused by the interference between the image pattern frequency and the sampling frequency. This effect is typically referred to as image aliasing. A strong possibility of aliasing exists at the visible portion of the MTF curve, if the spacial sampling frequency of the detection system falls substantially below the resolving frequency limit of the imaging system. This area is marked as hatched area in FIG. 2B for the above systems. Curve 21 represents number 1 system, curve 22 represents number 2 system, and curve 23 represents number 3 system.

As can be seen from FIG. 2B, while the numbers 1 and 2 systems (represented by the curves 21 and 22) have a fairly large range of frequencies prone to aliasing, the number 3 system (represented by the curve 23) has an upper resolution or visibility limit close to the sampling frequency and therefore would not show any aliasing effect.

Complete characteristics of an imaging system can be represented by its unique MTF curves. Each independent MTF curve can represent the imaging capability of the system at any object location (relative to the axial point) at any wavelength. Since the various MTF curves are independent responses, the portions of the MTF curves that are prone to aliasing in each case may occur at different frequency range and present different modulation level. Thus, aliasing may not occur with the same strength or at the same frequency for all the image locations. In addition, it may show some color characteristics. This is due to the imaging system having different modulation levels for the different colors at any particular aliasing frequency. This effect is referred to as color aliasing.

In a typical optical imaging system, different colors present in the imaging operation are equally corrected. This means that the MTF of the typical optical imaging system is such that the chromatic MTF is closely coupled with the MTF of individual colors. In such a system, color aliasing could result from a color dependent sampling rate at the sensor array when the imaging system is a digital imaging system.

To achieve color sampling in digital imaging systems, a different color filter (referred to as color mosaic) is used in front of the individual pixel elements of the sensor. Since the distribution of these color mosaics could vary from one color to another, depending on the specific color imaging processing technique used, different colors may be sampled at different sampling rates. FIG. 3 shows a color mosaic of a typical digital imaging sensor array. FIGS. 4A–4C illustrate the sampling rates for green, red, and blue colors of the color mosaic pattern of FIG. 3. As can be seen from FIGS. 4A–4C, the sampling rate of the red and blue colors of the color mosaic pattern in FIG. 3 are different from that of the green color. This in turn means that the different colors may start to alias at different frequencies. In other words, a different lower frequency boundary is set for the aliasing prone area under the MTF curves of the different colors.

One prior solution to eliminating aliasing in general (not specifically color aliasing) is to customize the total resolving power of the optical system or to alter the overall (chromatic) MTF curve. To prevent color aliasing in specific, this alteration of the MTF has to be effective on the lowest sampled color of the imaging sensor.

The most common embodiment of this prior solution is to introduce a bi-axial birefringent crystal such as quartz, in the form of a filter, at close proximity to the imaging sensor. The double refraction function of the crystal, causes the image to be split into two separate images on the sensor. One image is formed by the undeviated ordinary rays and the second by the displaced extraordinary rays. The secondary image displacement is related to the filter thickness and is made such that it is equal to the sampling pitch of the sensor. Thus, image information with exact repeated pattern as the sampling pitch shows zero modulation in this case, and its information content is completely lost. This in effect could be thought of as a form of low pass filtering of the image information, whereby the MTF of the system for frequencies around and above the sensor pitch are severely altered for all wavelengths.

Alteration of the MTF in such a way that the modulation for all the frequencies beyond the sampling rate falls below the visibility limit, regardless of color, eliminates the possibility of having the digital imaging system extracting any high frequency information from the higher frequency sampled colors. This in effect is an overcorrection of the problem. A more proper way of taking care of the color aliasing problem would be to eliminate aliasing for the specific colors that show aliasing in lower frequencies independently and without affecting the higher frequency sample colors.

SUMMARY OF THE INVENTION

One of the features of the present invention is to minimize color aliasing effect in a digital imaging system.

Another feature of the present invention is to maintain the resolution power of the digital imaging system.

A further feature of the present invention is to provide a digital imaging system that reduces color aliasing effects by having them occur with the same modulation level at a typical aliasing frequency for all colors.

Described below is an anti color aliasing filter for a digital imaging system and a method of making the same. The filter includes a first filtering region that allows any color to pass through. The filter also includes a second filtering region adjacent to the first filtering region to allow a particular color(s) to pass through in order to adjust the color frequency response of the digital imaging system to the remaining colors without affecting the color frequency response of the digital imaging system to the color(s) passing through the second filtering region, such that color aliasing is minimized in the digital imaging system.

Other features and advantages of the present invention will become apparent from the following detailed description, taken in conjunction with the accompanying drawings, illustrating by way of example the principles of the invention.

BRIEF DESCRIPTION OF THE DRAWINGS

FIGS. 9–10 show the optical system of FIG. 8 in more detail that includes an anti color aliasing filter.

DETAILED DESCRIPTION OF THE INVENTION

Figure 2A:
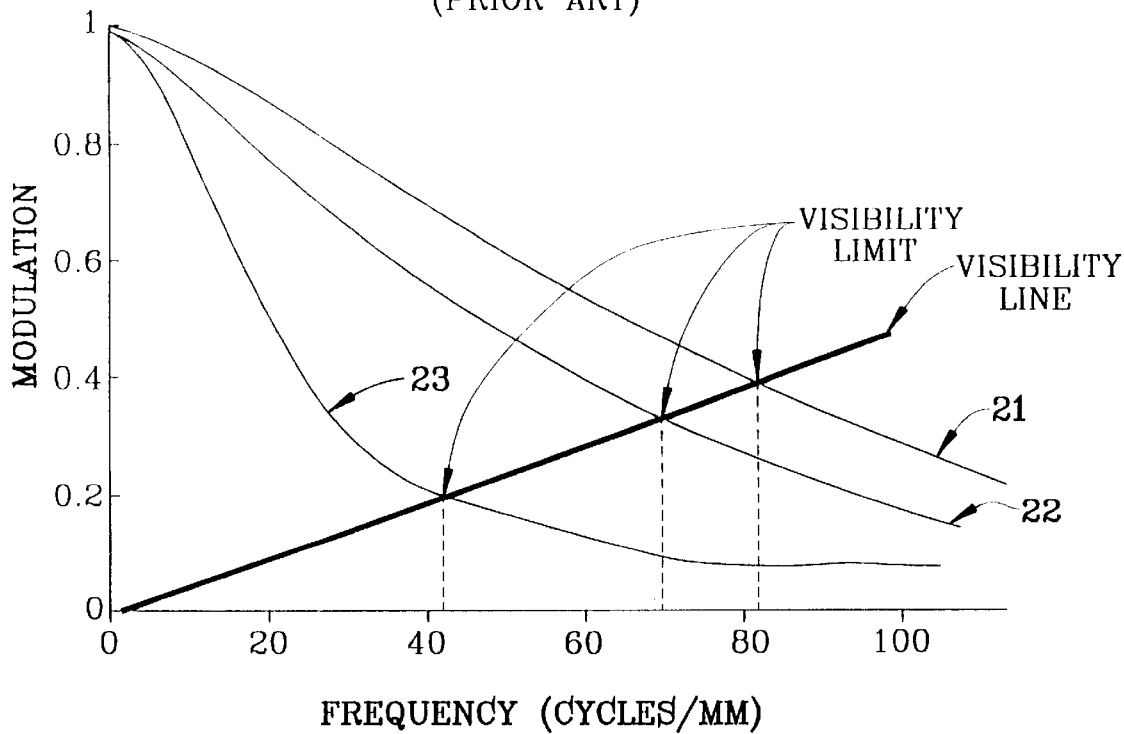
FIGS. 2A and 2B show MTF plots of the three imaging systems with respect to a range of frequencies.
Figure 2B:
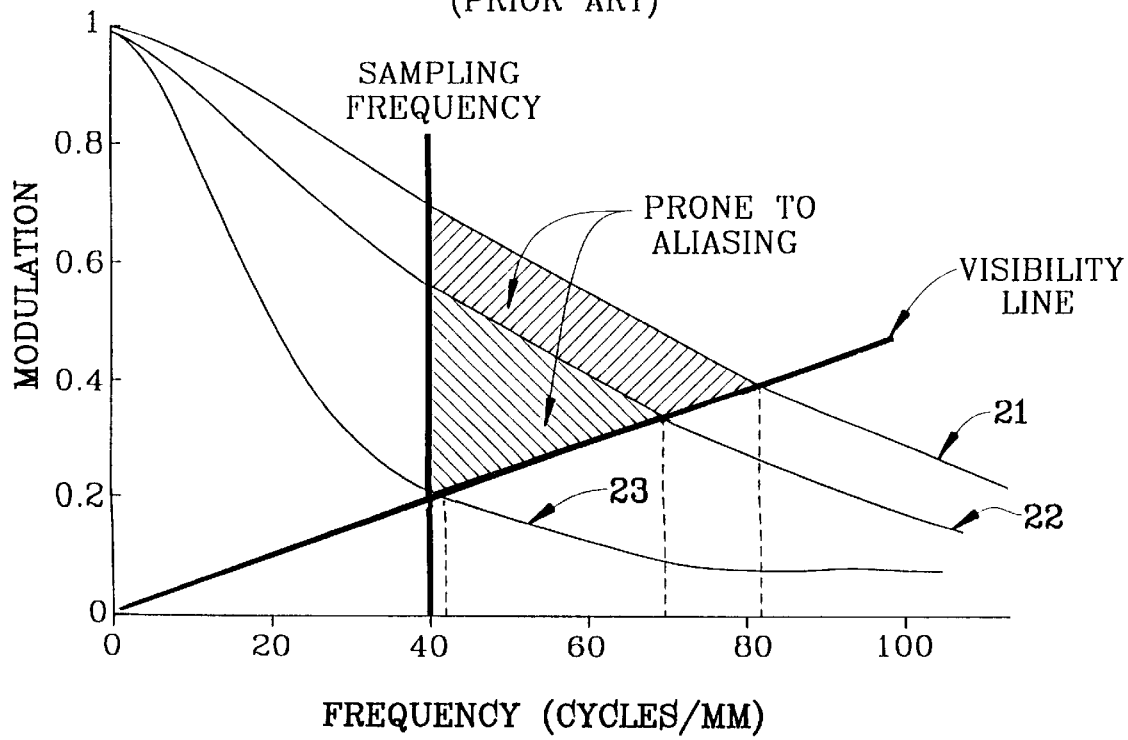
Figure 4A:
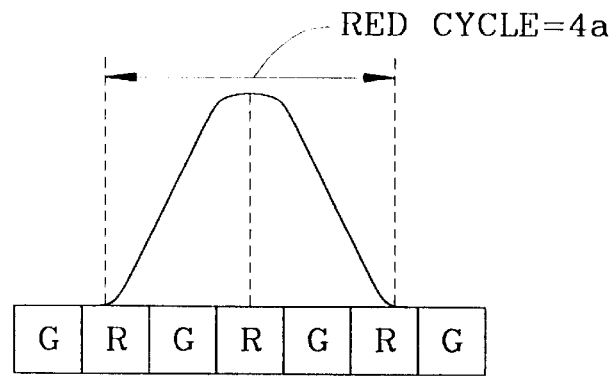
FIGS. 4A through 4C show the respective sampling cycle of each color of the color mosaic pattern of FIG. 3.
Figure 4B:
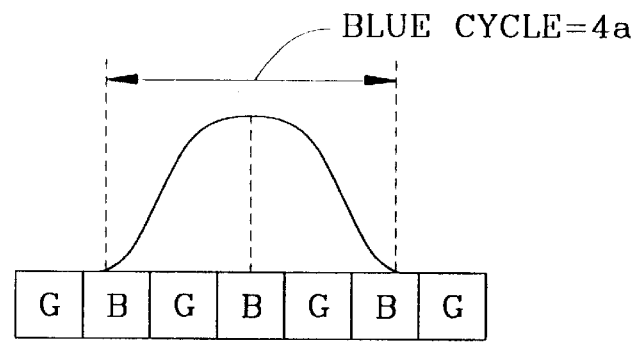
Figure 4C:
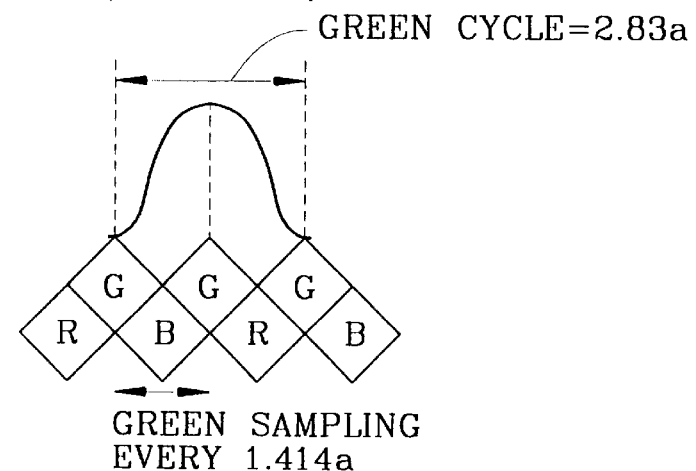

To minimize color aliasing effect in a digital imaging system, aliasing can be reduced for certain colors independently from other colors. In accordance with one embodiment of the present invention, this is achieved by tuning or altering the MTF responses of certain colors in the digital imaging system independent of other colors, such that all colors show small modulation at and beyond their respective sampling rates that are set by the color mosaic pattern on the sensor of the digital imaging system. This would be an MTF similar to the number 3 system that is represented by the curve 23 in FIG. 2B.

The MTF responses of the digital imaging system can be tuned or altered by altering the color frequency response of its optical system. In an optical imaging system, the ultimate resolution (i.e., the point spread function) of the optical system is determined by the size of the aperture stop of the optical system. The aperture stop typically is a finite and clear aperture stop that provides the same numerical aperture for all colors.

In accordance with one embodiment of the present invention, the aperture stop is turned into a color dependent aperture stop which allows different colors in the optical system to pass through aperture stops of different sizes. In other words, this color dependent aperture stop provides different effective numerical apertures for different colors, thus altering the PSF characteristics of the optical system.

Figure 5:
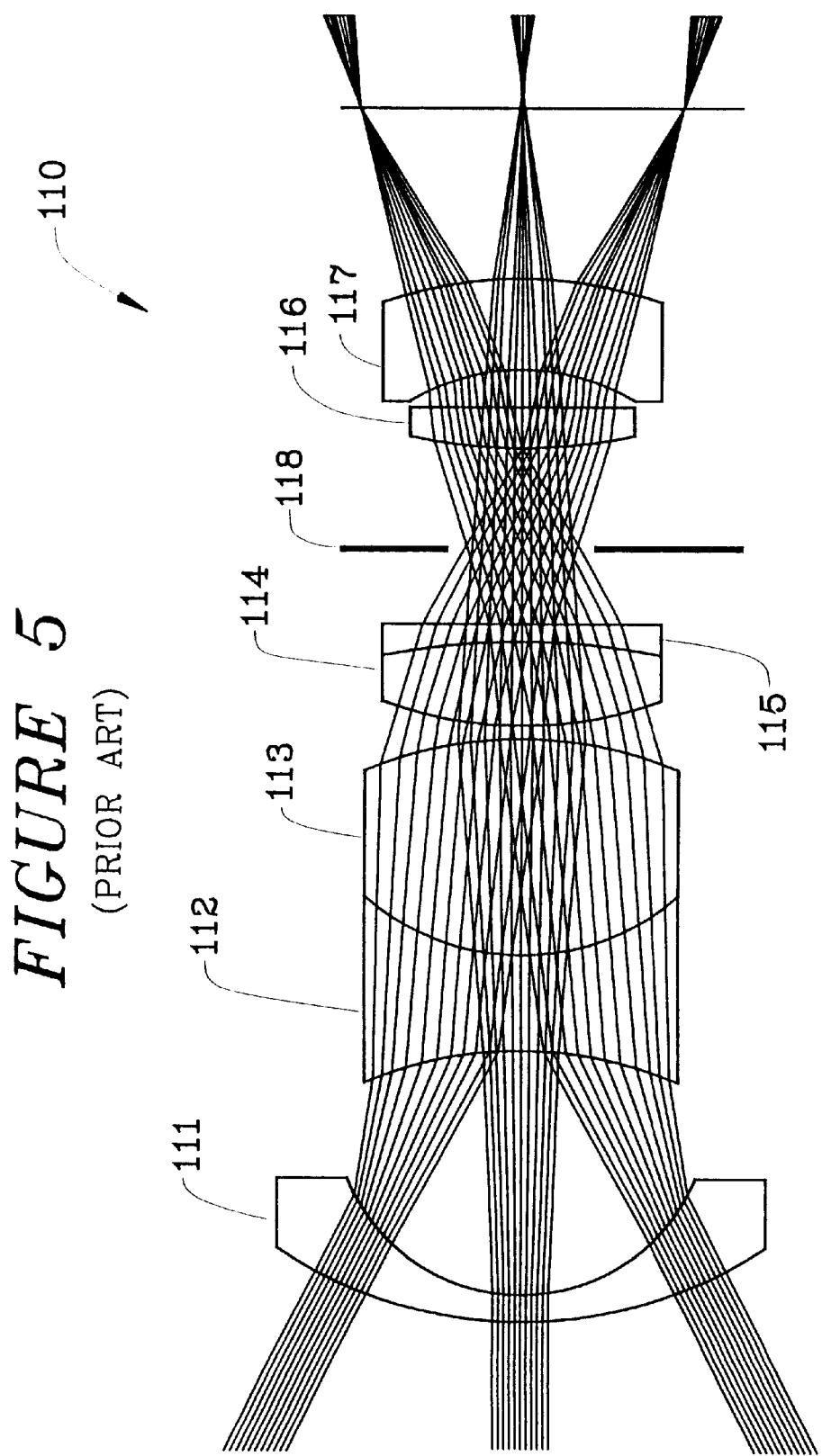
FIG. 5 shows a prior art optical system.
Figure 6:
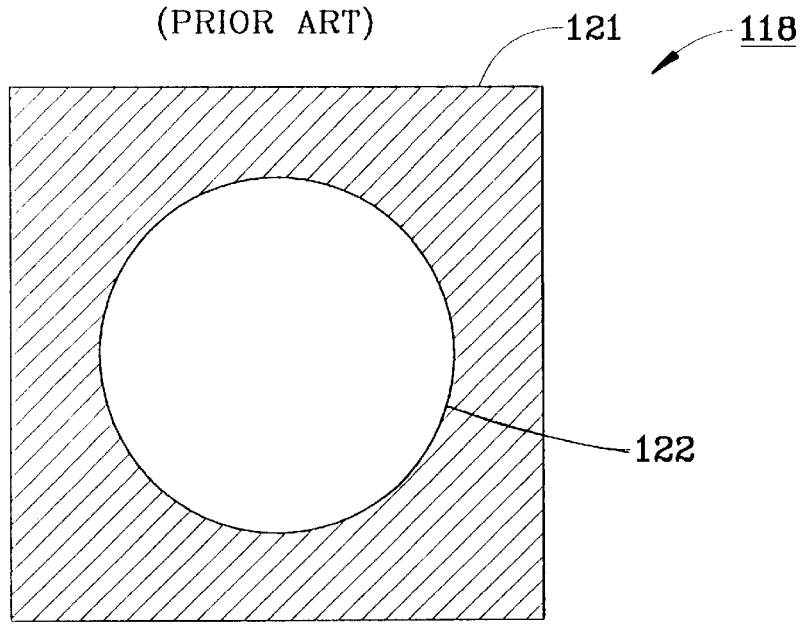
FIG. 6 is a front view of the aperture stop of the optical system of FIG. 5.
Figure 7A:
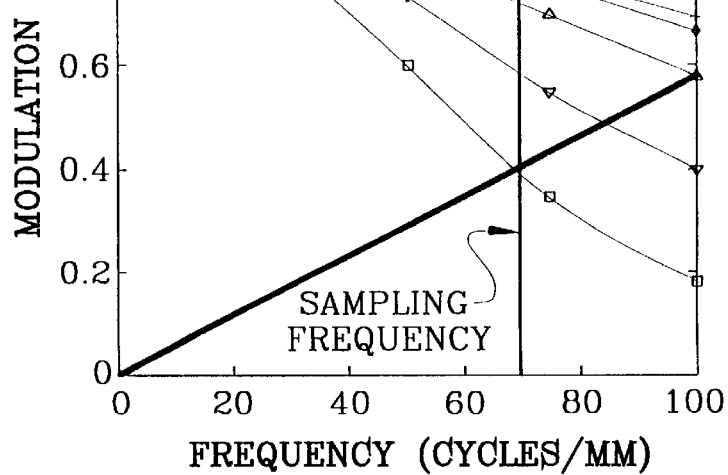
FIGS. 7A through 7C show the MTF plots of the optical system of FIG. 5 for green, red, and blue colors.
Figure 7B:
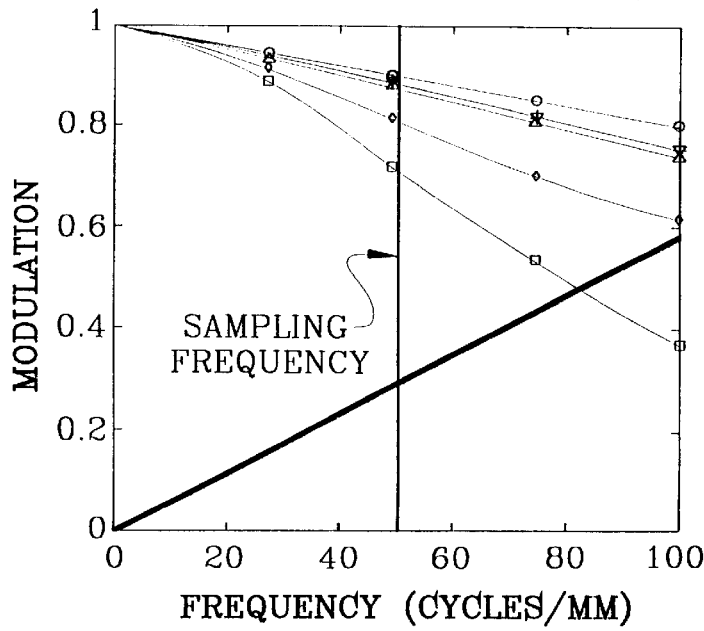
Figure 7C:
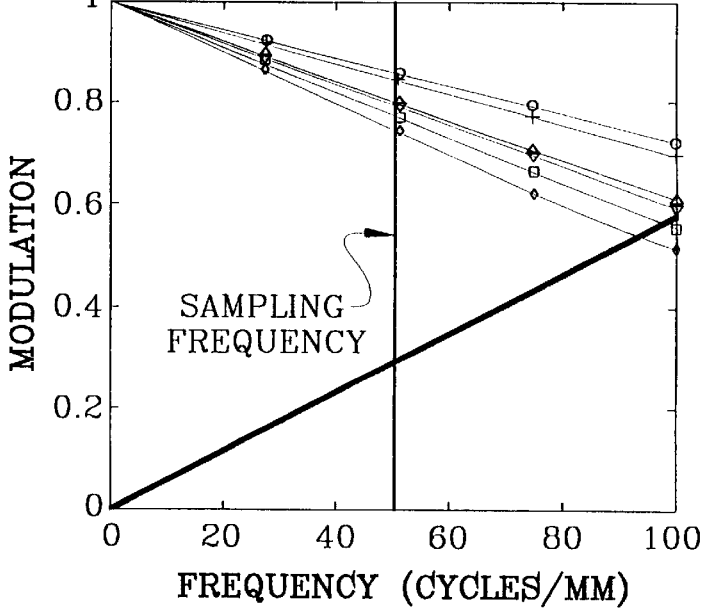
Figure 7D:
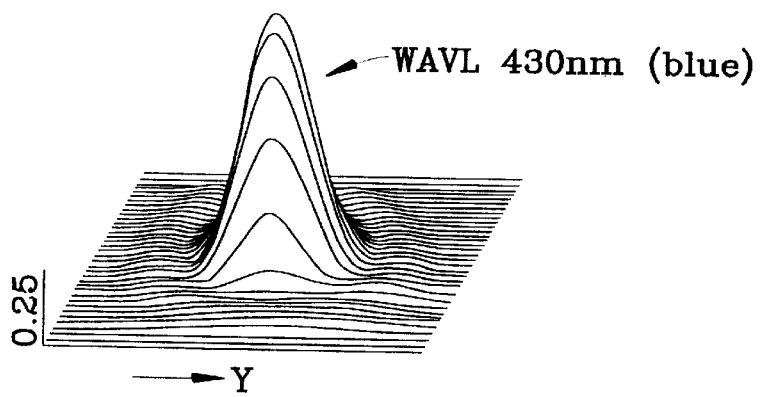
FIGS. 7D through 7F show the point spread function (PSF) curves for the axial points of the optical system of FIG. 5 for green, red, and blue colors.
Figure 7E:
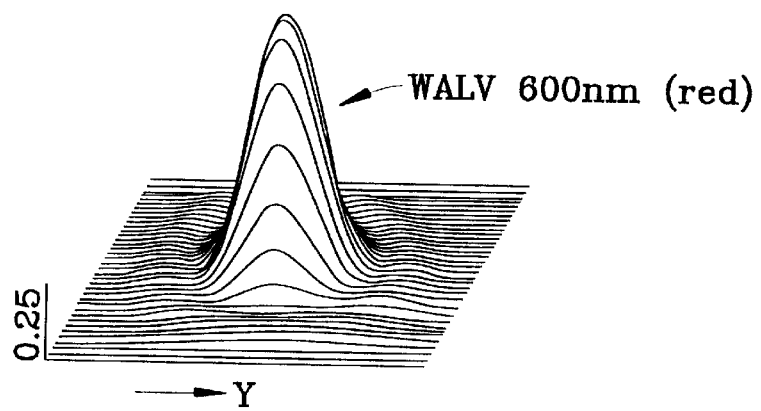
Figure 7F:
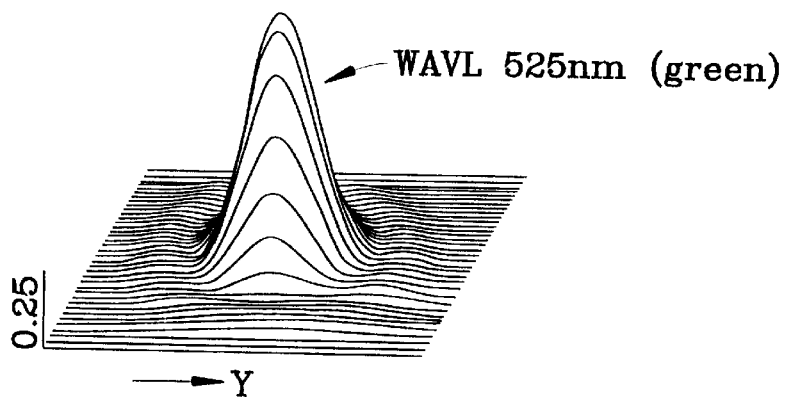

FIG. 5 shows a prior art optical system 110 with a finite and clear aperture stop 118 that defines the same numerical aperture of the optical system 110 for all colors. The optical system 110 also includes optical elements 111 through 117. FIG. 6 shows a front view of the aperture stop 118. FIG. 7A shows the MTF curves for green color for the entire field of the optical system 110. FIGS. 7B–7C show the MTF curves for blue and red colors for the entire field of the optical system 110. The corresponding sampling rates for the green, blue, and red colors are also noted in FIGS. 7A–7C. FIGS. 7D–7F show the point spread functions (PSFs) for the green, blue, and red colors of the optical system 110.

Figure 7G:
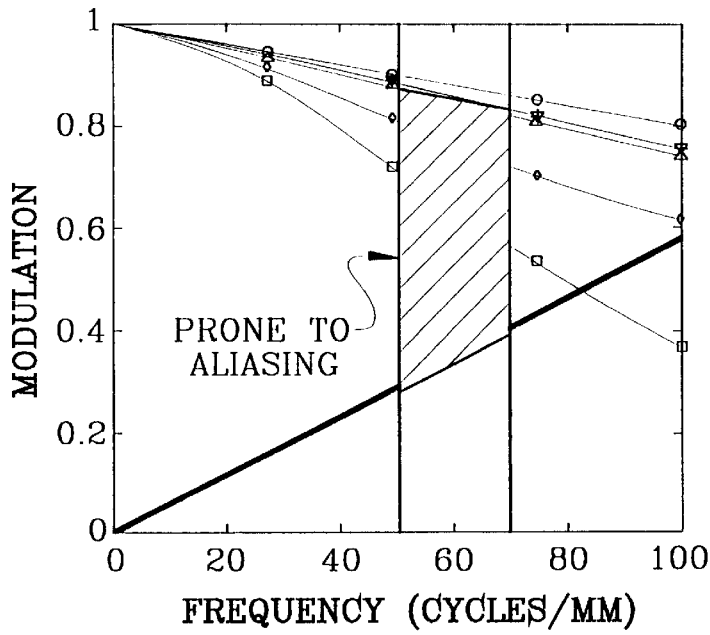
FIGS. 7G and 7H show the color aliasing prone areas of the optical system of FIG. 5 for blue and red colors.
Figure 7H:
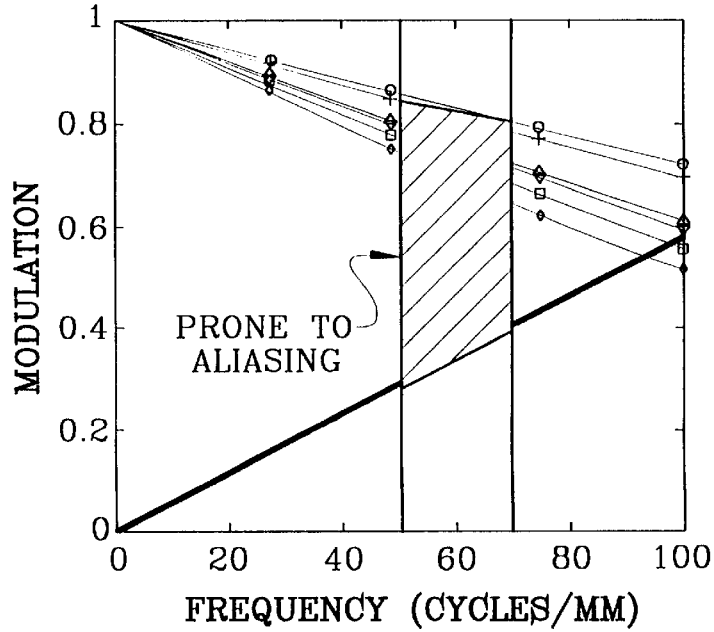

As can be seen from FIGS. 7A–7C, while a color image has a small possibility of aliasing in all three colors beyond green's sampling frequency (specially for the near axis field points), the red and blue color data are strongly prone to aliasing in the frequency range below the green sampling frequency and above the red and blue sampling frequencies. These aliasing prone areas for red and blue colors correspond not only to a fairly large range of frequencies, but also to a fairly large effective modulation depth (between the MTF line and visibility line), which means pronounced color separations as the image aliases. As seen from FIGS. 7B and 7C, this is true to a great degree for all the field locations. One object of the present invention is to avoid this color aliasing in red and blue colors, while leaving the superior resolving capability of the green color. The area this solution of the present invention specially needs to take effect is the frequency range between the red/blue sampling rates and the green sampling rate, where modulation is large as noted in FIGS. 7G and 7H.

Figure 8:
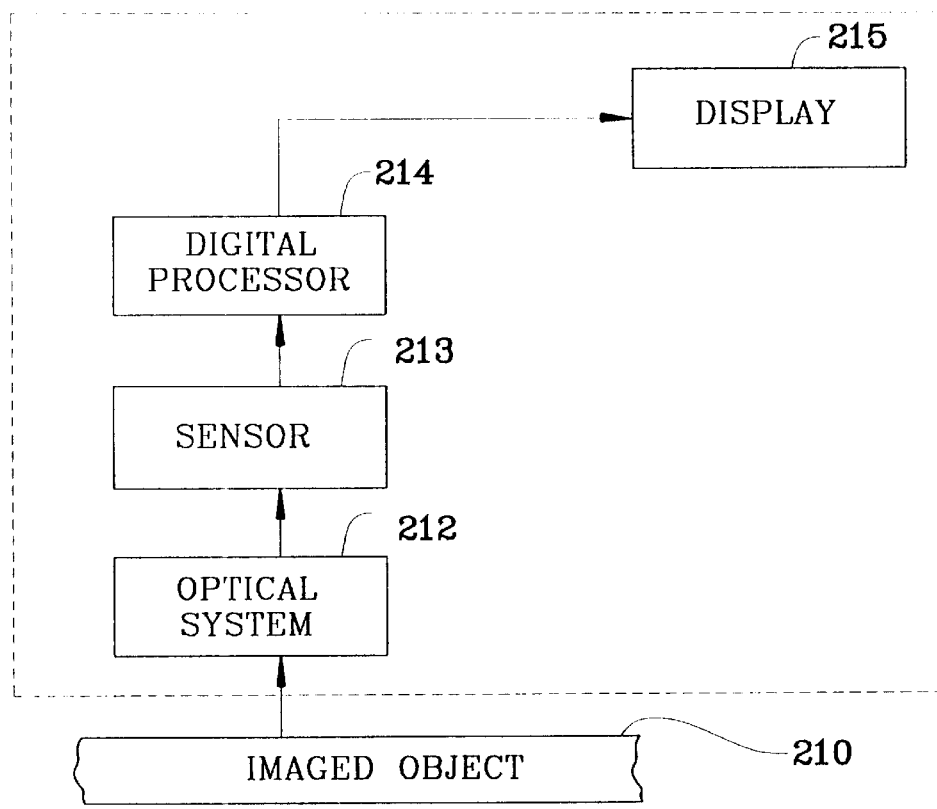
FIG. 8 shows a digital imaging system having an optical system that implements one embodiment of the present invention.

FIG. 8 shows a digital imaging system 211 that includes an optical system 212 that implements one embodiment of the present invention. In accordance with one embodiment of the present invention, the optical system 212 includes an aperture stop 310 (shown in FIGS. 9–10) with different effective aperture sizes for different colors. This turns the aperture stop 310 into a color dependent aperture stop which introduces different size PSFs for different colors. This color dependent aperture stop 310 allows different colors in the digital imaging system 211 in effect to pass through aperture stops of different sizes, thus effectively altering the MTF responses of the optical system 212 for different colors. This in turn reduces the chance of certain less frequently sampled colors of the digital imaging system 211 to alias at lower frequencies. The color dependent aperture stop 310 can be generically referred to as anti color aliasing filter. The optical system 212 and the color dependent aperture stop 310 will be described in more detail below, also in accordance with FIGS. 9–14C.

Figure 1:
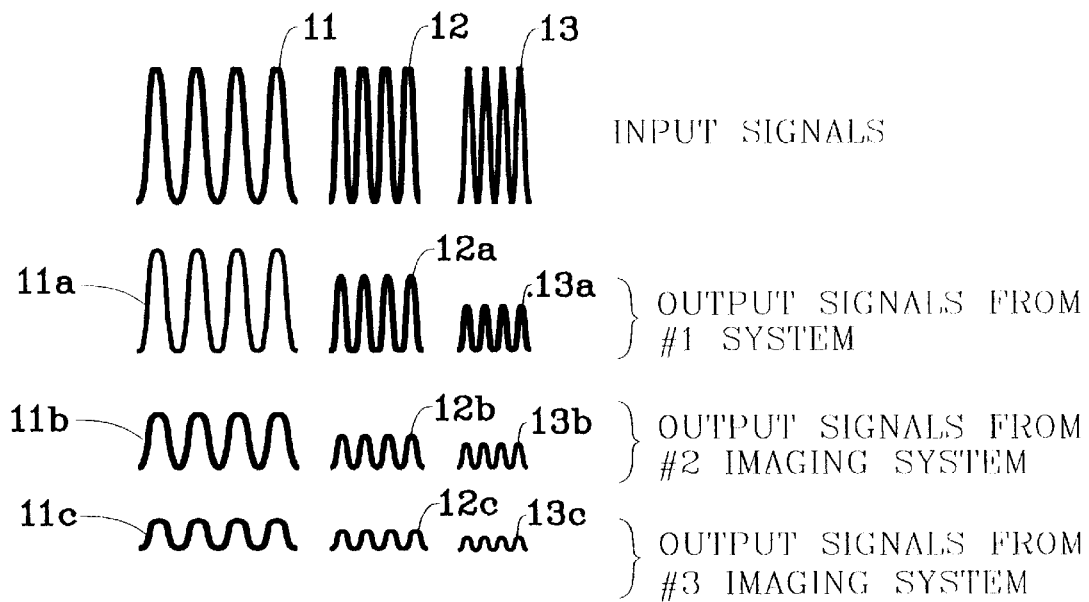
FIG. 1 shows the representative behavior of three prior art imaging systems with different MTF responses to a range of spacial frequency signals.
Figure 3:
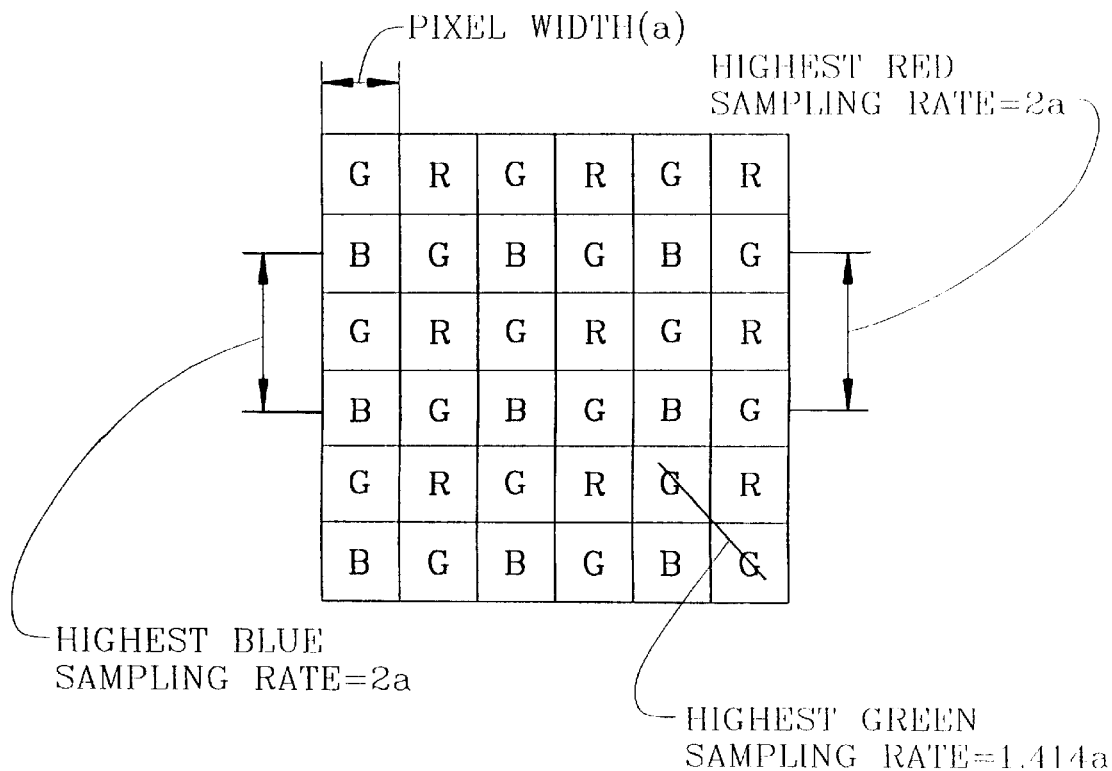
FIG. 3 shows a color mosaic pattern of color filters for a sensor.

Referring again to FIG. 8, the digital imaging system 211 also includes a sensor 213 that is optically aligned with the optical system 212. The sensor 213 includes color filters (not shown) placed in front of each pixel of the sensor 213. In one embodiment, the color filters are formed in a color mosaic pattern of FIG. 3. In other embodiments, the color mosaic pattern can be different from that of FIG. 3.

The optical system 212 images an object of interest 210 onto the sensor 213. The object of interest 210 may be a document or an image to be scanned by the digital imaging system 211 into a computer system (not shown). However, the digital imaging system 211 may be used in other applications. For example, the digital imaging system 211 may be used in such applications as surgical imaging, microscope analysis, and wide-scene viewing.

The sensor 213 samples the image directed by the optical system 212 and generates digitized raw data representative of the image. In one embodiment, the sensor 213 is a CCD (Charge Coupled Device) array used to provide a grid pattern of quantified sample values at selected intervals. Alternatively, the sensor 213 can be implemented by other known sensing means or circuit.

The digital imaging system 211 also includes a digital processor 214 that processes the image data from the sensor 213 to produce the final image displayed on a display 215. The display 215 may be a computer display, a projection display, or a printer. Alternatively, the display 215 can be any known viewing media. The digital processor 214 can also be implemented by any known digital signal processor.

In one embodiment, the optical system 212 is a diffraction limited optical system. Alternatively, the optical system 212 can be other type of optical system.

Figure 10:
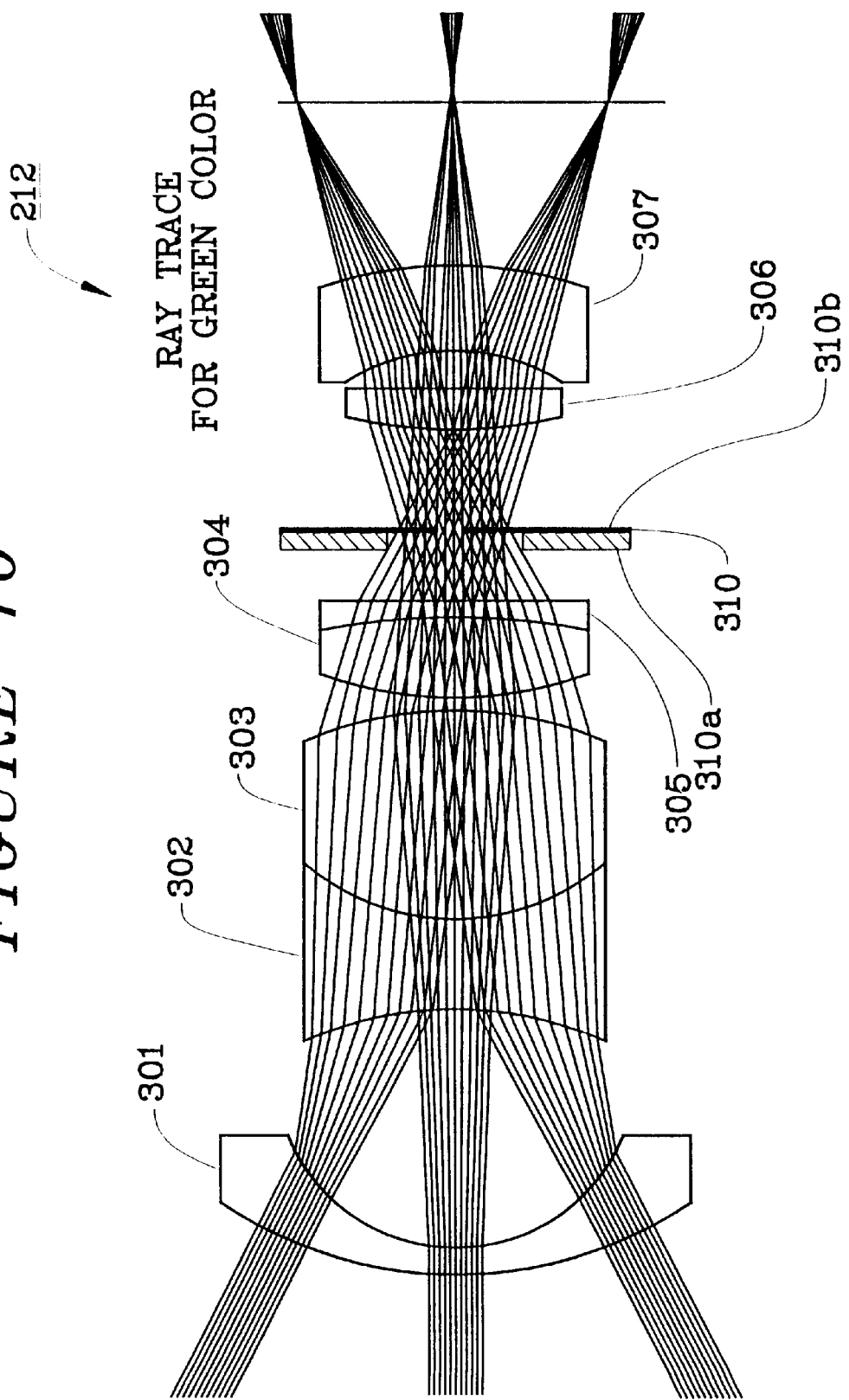

FIGS. 9–10 show in more detail the optical system 212. FIG. 9 shows the ray trace of the optical system 212 for the blue and red colors and FIG. 10 show the ray trace of the optical system 212 for the green color. Alternatively, more or fewer colors than above mentioned may be used. However, the same principles of the invention apply even when more or fewer colors are employed.

Figure 11:
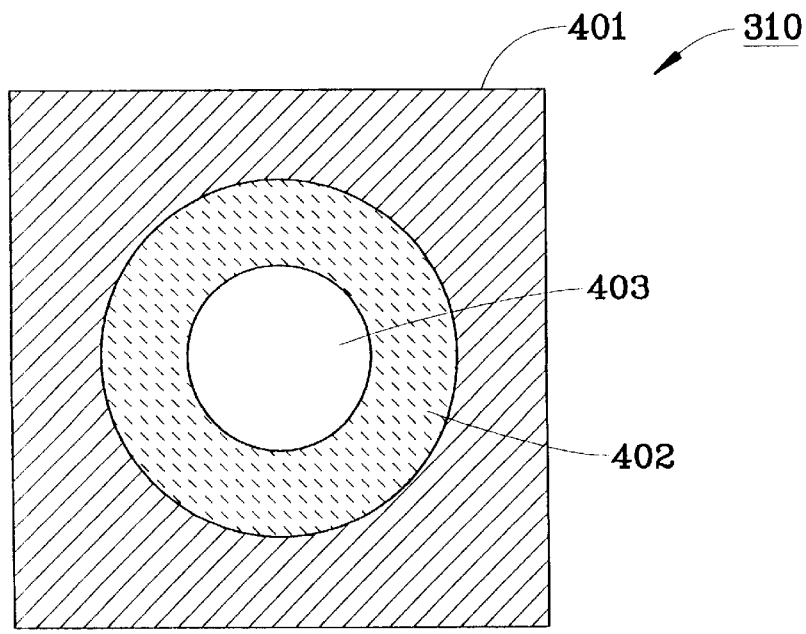
FIGS. 11–12 show different embodiments of the anti color aliasing filter of FIGS. 9–10.
Figure 12:
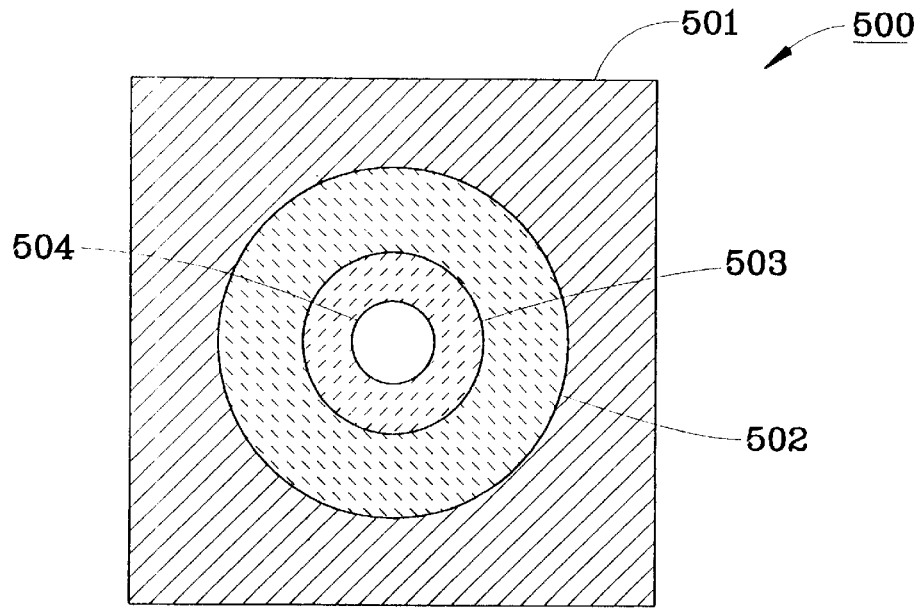

As can be seen from FIGS. 9–10, the optical system 212 includes optical elements 301 through 307. The optical elements 302 and 303 are joined as doublets and the optical elements 304 and 305 are joined as doublets. The color dependent aperture stop 310 is between the optical elements 305 and 306. The color dependent aperture stop 310 includes a finite and clear aperture stop 310a and a ring color filter 310b incorporated with the clear aperture stop 310a. The ring color filter 310b allows a particular color or colors to pass through while filtering out all other colors. The ring color filter 310b is concentric with the clear aperture stop 310a, in one embodiment. The ring color filter 310b may include one ring color filter or multiple ring color filters. FIGS. 11–12 show two different embodiments of the ring color filter 310b, which will be described in more detail below.

As can be seen from FIG. 11, the color dependent aperture stop 310 includes a frame 401 that is opaque to all colors. This means that no color passes through the frame 401. The color dependent aperture stop 310 also includes a ring color filter 402 which is next to the frame area 401. The color filter 402 allows one or more particular colors to pass through while blocking all other colors from passing through.

The color dependent aperture 310 also includes a clear aperture stop 403 concentric with and adjacent to the color filter 402. The clear aperture stop 403 allows all colors to pass through. This means that the color dependent aperture stop 310 has two effective aperture stops, one defined by the perimeter of the color filter 402 for the particular colors and the other defined by the perimeter of the clear aperture stop 403 for all of the remaining colors.

In order to reduce the MTF responses for the red and blue colors, the color filter 402 is made as a green color filter. This effect can be viewed as the ring color filter 402 reduces the effective aperture size for the blue and red colors. If the perimeter of the ring color filter 402 is equal to that of the clear aperture stop 118 of FIG. 5, then the MTF responses for the blue and red colors have been altered while the MTF for the green color remains the same. This will be described in more detail below, also in conjunction with FIGS. 14A–14C.

Figure 14A:
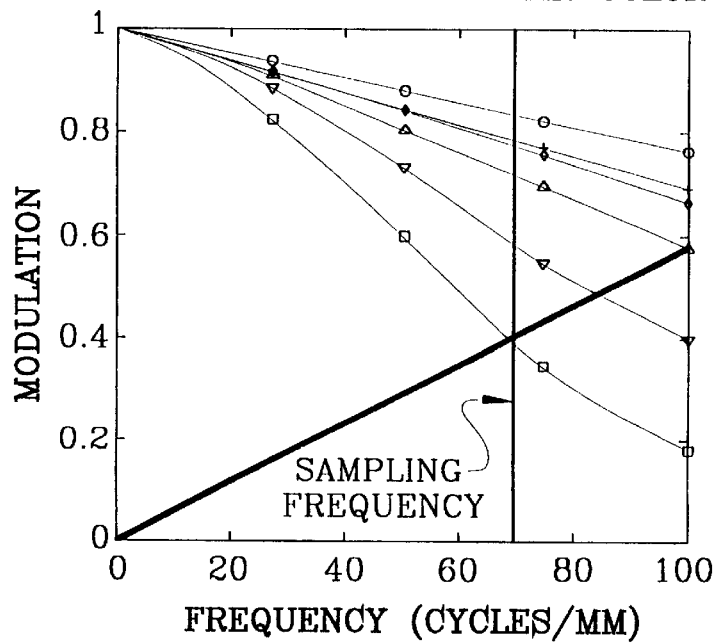
FIGS. 14A through 14C show the MTF plots of the optical system of FIGS. 9–10 for the green, red, and blue colors.
Figure 13A:
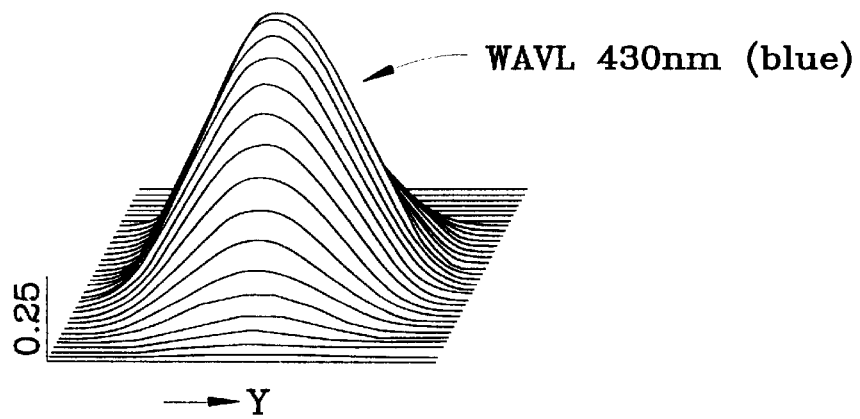
FIGS. 13A through 13C show the point spread function curves for the axial points of the optical system of FIGS. 9–10 for green, red, and blue colors.
Figure 13B:
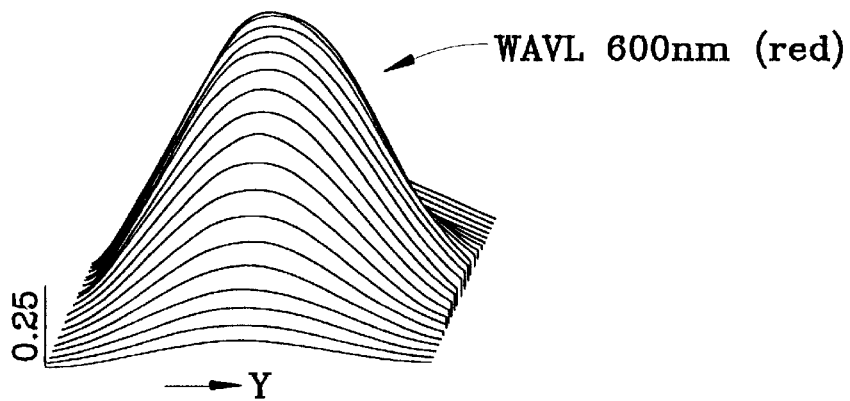
Figure 13C:
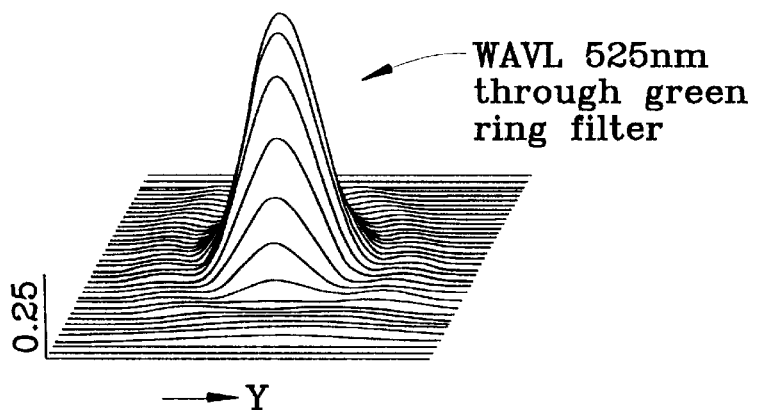
Figure 14B:
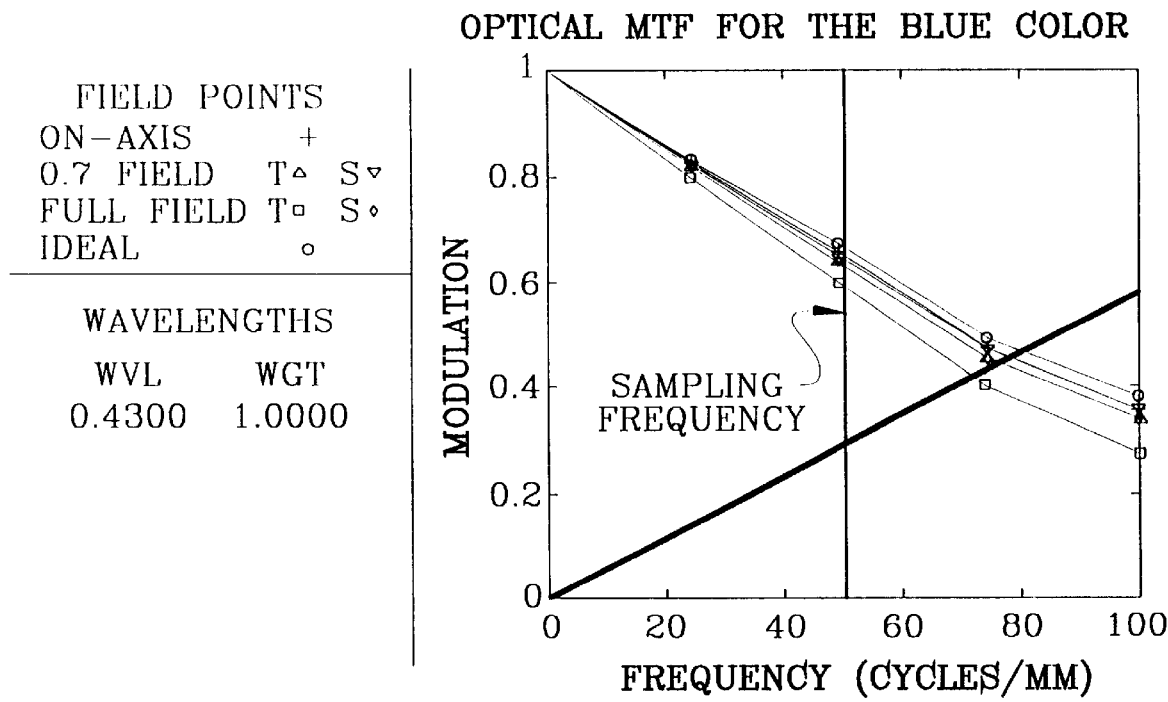
Figure 14C:
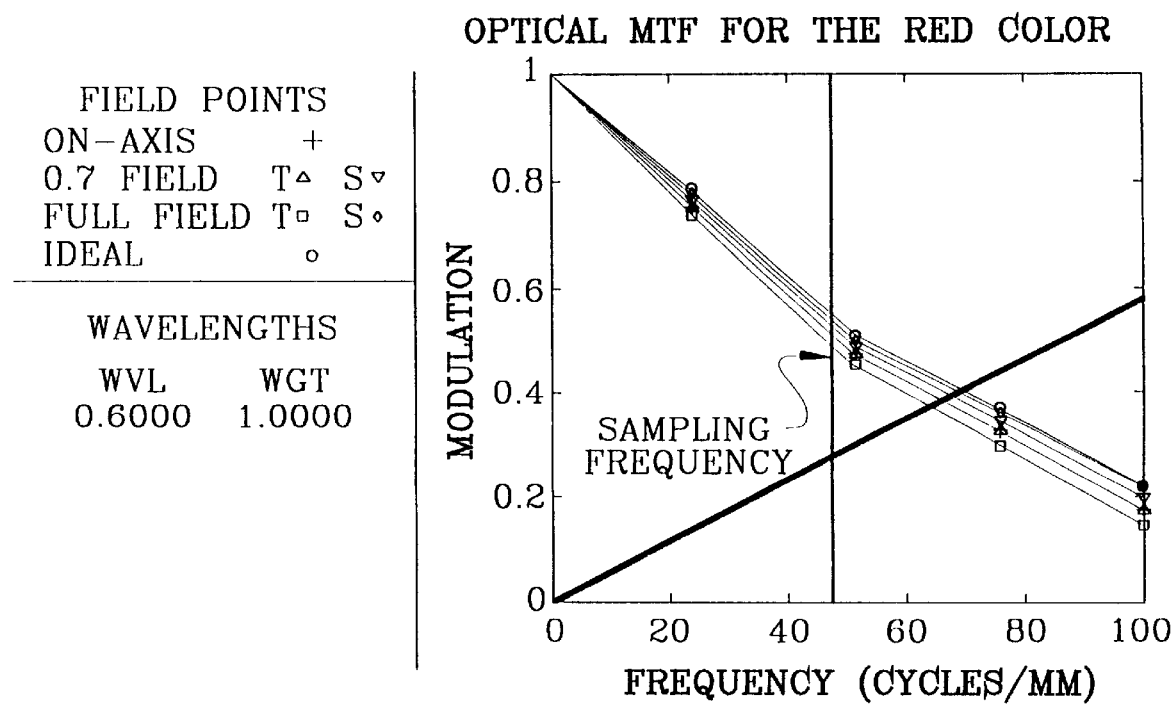

FIGS. 14A–14C show the MTF responses of green, blue, and red after the insertion of the ring color filter 402. As can be seen from these figures, while the green MTF response is unaffected by the insertion of the color filter 402, the MTF responses of the blue and red have been altered in such a way that sufficiently low modulation is given at the aliasing prone frequencies (see FIGS. 7G–7H). This indicates that the color dependent aperture stop 310 has reduced the MTF responses for blue and red colors in a manner that reduces the possibility of aliasing of these colors below the green sampling rate, while still having high modulation for all colors below their own respective sampling rates. FIGS. 13A–13C show that the PSFs for red and blue colors are now extended due to the smaller effective aperture stop (as compared to that of FIG. 5) while the PSF for green color shows no change (as compared to that of FIG. 5). This is because the green color is now transmitted through the ring-shaped green color filter 402 (as seen from FIG. 10).

FIG. 12 shows an aperture stop 500 which implements another embodiment of the color dependent aperture stop 310 of FIGS. 9–10. As can be seen from FIG. 12, the color dependent aperture stop 500 includes a frame 500 that is opaque to all colors and two ring color filters 502 and 503 which are adjacent to the frame area 501. Each of the color filters 502 and 503 can allow one specific color or a range of colors to pass through. This can further alter the MTF responses for each of the sampled colors and allow one to tailor the MTF responses of these colors to their respective sampling characteristics at the sensor.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An anti-color aliasing filter for a digital imaging system, comprising:

(A) a first ring color filter having a clear aperture of a predetermined diameter at the center of the first ring color filter, the clear aperture allowing all colors to pass through, the first ring color filter surrounding and concentric with the clear aperture to allow only a first particular color to pass through such that the digital imaging system has a different color frequency response for the first particular color than the color frequency response for the remaining colors only passing through the clear aperture to minimize color aliasing in the digital imaging system;

(B) a frame that does not allow any color to pass through and that surrounds the first color ring filter.

2. The anti-color aliasing filter of claim 1, further comprising a second ring color filter that surrounds the first ring color filter to allow a second particular color to pass through.

3. The anti-color aliasing filter of claim 2, wherein the second ring color filter is concentric with the first ring color filter.

* * * * *